Patented Aug. 1, 1944

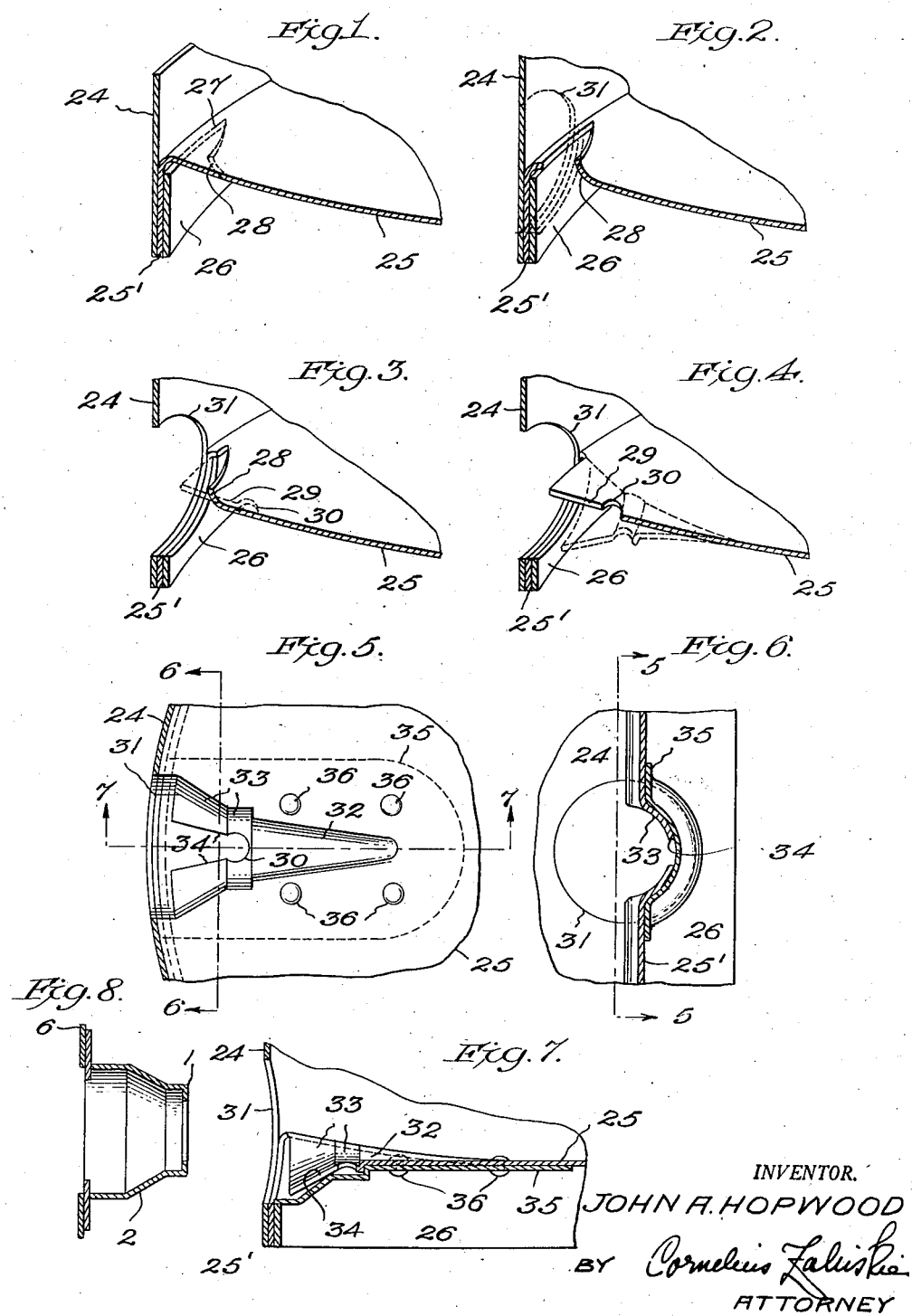

2,354,995

UNITED STATES PATENT OFFICE 2,354,995

METHOD OF REMODELING MILK CANS

John A. Hopwood, Great Neck, N. Y., assignor to Monitor Process Corporation, Jersey City, N. J., a corporation of New Jersey Original application July 15, 1940, Serial No. 345,634. Divided and this application May 1, 1942, Serial No. 441,310

1 Claim. (Cl. 113—120)

This invention is a division of my copending application, Serial No. 345,634, filed July 15, 1940, which matured as Patent No. 2,292,836, patented Aug. 11, 1942. That patent describes and claims an outlet for milk delivery cans wherein milk is delivered through one of the walls of the can by way of a milk delivery tube which operates through an outlet packing in the wall of the can.

Special cans may be built to permit of the delivery of milk through one of the walls as stated, but inasmuch as the conventional milk delivery can is not so constructed it frequently becomes expedient to modify or remodel the same for this type of delivery. The present invention discloses a method whereby such a standard can may be remodeled for this purpose, in a simple, economical and thoroughly efficient way.

The invention is particularly adapted for employment in connection with the remodeling of cans to permit of milk delivery through the side wall of the can. This type of delivery involves numerous problems for in the conventional can the bottom wall of the can is generally dished so as to be considerably deeper in the center than at its periphery, where the delivery of milk is desired. The method of this invention provides for the remodeling of the can in such a manner that all the milk may be drained therefrom through the side wall of the can.

Generally speaking, the invention makes this possible by forming in the side wall of the can an opening at an elevation at least as low as the lowermost point in the bottom wall of the can, then slitting a portion of the wall adjacent the opening in such manner that the portions of the bottom wall of the can, adjacent the slit or slits thus formed, may be depressed to form a drainage channel from substantially the center of the bottom wall to the opening formed in the side wall, thereafter sealing the slits thus provided to produce liquid tight joints and finally securing in the opening in the side wall an appropriate mounting for a discharge outlet.

Features of the invention, other than those adverted to, will be apparent from the hereinafter detailed description and claim, when read in conjunction with the accompanying drawing.

The accompanying drawing shows one practical embodiment of the invention, but the construction therein shown is to be understood as illustrative, only, and not as defining the limits of the invention.

Figures 1-4 inclusive are fragmentary perspective sections showing the lower portion of the side wall of the can and a part of the bottom wall in section and showing consecutive steps in the method of remodeling these parts to permit of the installation of a cup which will serve as a mounting for a discharge tube.

Figure 5 is a horizontal fragmental section looking down on the bottom of the can, showing the method step next following that illustrated in Figure 4. This section is taken on the line 5—5 of Figure 6.

Figure 6 is a section on the line 6—6 of Figure 5.

Figure 7 is a section on the line 7—7 of Figure 5.

Figure 8 is a section of a mounting cup for the discharge tube.

In Figures 1-7, 24 shows a portion of the side wall of a conventional can, the can bottom being indicated at 25, and 26 designates the usual reinforcing ring which is commonly secured about the inner periphery of the downwardly extending peripheral flange 25' of the bottom 25. The bottom 25 is dished after the manner common to conventional cans. Figure 1 shows in full lines the structure of the can before the start of the remodeling operation.

It is to be understood, with respect to Figures 1-4 and 7 that the sections taken are in the medial plane of the zones of operation and that the can parts at both sides of the section are symmetrical and a duplication of what is shown in these figures.

The first step in the method consists in forming a slit 27 in the bottom of the can directly adjacent the inner surface of the ring 26 and opening up the inner margin of this slit as indicated at 28. This can be accomplished by forcing a sharp pointed cutter through the bottom of the can to produce the results shown in dotted lines in Figure 1 and in full lines in Figure 2.

The next step in the method consists in boring a hole 31 through the side wall 24, of a diameter big enough to receive the maximum exterior diameter of the side wall 2 of the cup 1 shown in Figure 8. This cut can be conveniently made with a hollow cylindrical sharp edged cutter and should pass through not only the wall 24, but also the peripheral flange 25' of the bottom and also the reinforcing ring 26. In other words, this cut should extend through the side wall of the can to the slit 27, as indicated in dotted lines in Figure 2 and in full lines in Figure 3.

The next step in the operation consists in bending down the margins 28 shown in full lines in Figure 3, into the dotted line position of that figure. Immediately thereafter a slot 29 is formed from the edge of the slit 27 to a circular hole 30 spaced from the side wall. The hole 30 may be punched or bored and the slot 29 may be cut with a hack saw or other suitable implement, so that at the conclusion of this step, the parts will appear as shown in dotted lines in Figure 3 and in full lines in Figure 4.

The next step in the method consists in shaping that portion of the bottom 25 directly in line with the opening 31, so that the portion of the bottom directly adjacent the opening will substantially conform thereto. This may be conveniently accomplished by means of an appropriate die which will press down this portion of the bottom as shown in dotted lines in Figure 4 and form therein a gutter 32, shown best in Figures 5 and 7. This operation should be so carried out that the gutter formed will be shaped to accommodate the dispensing tube adapted to be associated with cup 1, while those portions of the bottom directly adjacent the opening will be shaped, as shown at 33, to substantially correspond to the shaping of the opening and to the cup 1 to be received in said opening.

When the bottom is acted upon in this way, the slit 29 which was formed, opens somewhat as shown in Figures 5 and 6 and permits the forming of the bottom in the desired shape without rupturing the metal thereof.

After the bottom has been formed as stated, the next step consists in placing directly beneath the thus formed portion of the bottom a reinforcing plate 35 shaped to conform with and underlie that portion of the bottom which has been shaped as stated, and a further portion of the bottom and ring 26 directly adjacent thereto, so that the plate underlies and reinforces that portion of the bottom adjacent the opening 31. The plate 35 and the abutting portion of the bottom are thoroughly tinned or otherwise prepared for attachment to one another and they are thereupon sweated in place. The attachment can be augmented by rivets 36 if desired or, alternatively, the plate 35 may be welded in place. The finished construction appears as shown in Figure 7, although the edges may be overlaid with solder or otherwise, as may be desired.

From a comparison between Figures 1 and 7, it will be noted that, through the operations described, a conventional can may be readily remodeled to provide a side delivery opening through which milk may be delivered through an appropriate discharge tube, such as described in my parent disclosure.

It will of course be understood that any appropriate mounting may be provided for supporting the delivery tube in the opening 31 thus provided, but in Figure 8 I have shown in section a cup 1, suited to this purpose. This cup is of the structure shown in said parent application, and is merely seated in the opening 31, so that the side wall 2 of the cup extends into the opening with close conformity and with its lower portion seated in the substantially semi-conical gutter adjacent the opening and with the exterior annular flange 6 of the cup bearing against the outer face of the wall 24. The cup may be welded, soldered, riveted, or otherwise secured in place in the opening, as stated, to serve as a mounting for the discharge tube. The tube in practice is adapted to extend through the cup in which an appropriate gasket is adapted to be seated.

I have described the operations illustrated in Figures 1-7 in connection with the use of simple implements to carry out these steps so that they may be clearly understood. Special machinery and apparatus are, however, employed in commercially practising this method, so as to expedite the operations and produce uniform results.

In the foregoing detailed description, I have set forth the invention in one of its preferred practical forms and one method for carrying out the same, but the invention is to be understood as fully commensurate with the appended claim.

Having thus fully described the invention, what I claim as new and desire to secure by Letters Patent is:

The method of preparing a milk can, having a substantially cylindrical side wall and a dished bottom positioned above the lower edge of said side wall, for the delivery of milk through said side wall adjacent said bottom, which comprises the following steps: slitting the can bottom arcuately adjacent to and substantially parallel with the side wall, forming in the can bottom a radial slit extending inwardly from a point medially of the length of the arcuate slit, cutting a milk delivery opening through the side wall to the arcuate slit in the bottom with at least a portion of said opening below said arcuate slit, forcing those portions of the bottom marginally of the radial slit downwardly into substantially the shape of the lower portion of the contour of the delivery opening of the side wall to provide a discharge channel, thereafter permanently attaching to the can bottom a reinforcing plate which closes the arcuate slit and bridges the thus deformed radial slit and overlies and closely conforms to the margins thereof to reinforce the same and preclude leakage through the aforesaid slits, and thereafter securing a discharge tube mounting in the delivery opening in register with the discharge channel.

JOHN A. HOPWOOD.